Jan. 22, 1974 G. A. HUGHES ET AL 3,787,395
13-ETHYL-11-OXYGENATED GONENES
Original Filed Jan. 13, 1969
2 Sheets-Sheet 1
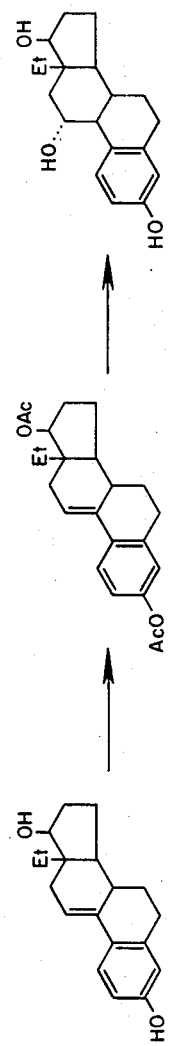
FIG. 1
FIG. 2
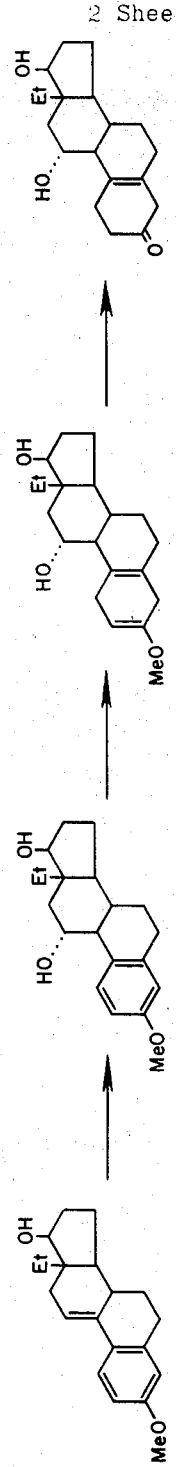
INVENTORS
GORDON A. HUGHES
HERCHEL SMITH
BY *Vito Victor Bielina*
ATTORNEY

INVENTORS
GORDON A. HUGHES
HERCHEL SMITH
ATTORNEY

United States Patent Office 3,787,395
Patented Jan. 22, 1974

3,787,395
13-ETHYL-11-OXYGENATED GONENES

Gordon Alan Hughes, Haverford, and Herchel Smith, Wayne, Pa., said Hughes assignor to said Smith
Continuation of application Ser. No. 110,336, Jan. 27, 1971, which is a continuation of application Ser. No. 790,569, Jan. 13, 1969, which is a continuation-in-part of application Ser. No. 602,785, Dec. 19, 1966, all now abandoned, which in turn is a continuation-in-part of application Ser. No. 228,384, Oct. 4, 1962, and Ser. No. 401,891, Oct. 6, 1964, now abandoned. This application Feb. 16, 1973, Ser. No. 333,085
Int. Cl. C07c 173/00
U.S. Cl. 260—239.55 C      8 Claims

ABSTRACT OF THE DISCLOSURE 11-oxygenated 13-ethyl-gon-5(10)-en-3-ones and 13-ethyl-gon-4-en-3-ones with corticoidal activity are prepared from 13-ethyl-gona-1,3,5(10),9(11)-tetraenes by hydroboration and oxidation to the corresponding 11-oxygenated gona-1,3,5(10)-triene, Birch reduction to the gona-2,5(10)-diene and hydrolysis.

---

This application is a continuation of U.S. application Ser. No. 110,336, filed Jan. 27, 1971, now abandoned, which is a continuation of U.S. application Ser. No. 790,569, filed Jan. 13, 1969, now abandoned, which is a continuation-in-part of U.S. application Ser. No. 602,785, filed Dec. 19, 1966, now abandoned, which is a continuation-in-part of U.S. application Ser. No. 401,891, filed Oct. 6, 1964, now abandoned, and U.S. application Ser. No. 228,384, filed Oct. 4, 1962.

This invention relates to compositions of matter classified in the art of chemistry as 13-ethyl-11-oxygenated gonenes, to intermediates therefor, and to processes for making such compositions.

The term "gonane," as used by chemists, refers to the unsubstituted tetracyclic cyclopentanoperhydrophenanthrene nucleus. In the normal configuration of the gonane nucleus, the hydrogen atoms appearing at the 8-, 10- and 13-positions possess what is designated as the β-configuration, i.e. they extend in a direction above the average plane of the tetracyclic ring system, and hydrogen present at the 9- and 14-positions possess what is designated as the α-configuration, i.e. they extend in a direction below the plane of the ring system. While the gonane compounds of this invention are named to describe the sterochemical configuration corresponding to that of the natural steroids, it is understood that the product of each of the given reactions is a racemic mixture of the named compound and its enantiomorph.

In describing the invention, reference will be made in this specification to the annexed drawings, wherein:

FIG. 1 illustrates schematically the reaction sequence for preparing a 13-ethyl-11-oxygenated gona-1,3,5(10)-triene, specifically 13-ethylgona - 1,3,5(10) - triene-3,11α-17β-triol.

FIG. 2 illustrates the reaction sequence for preparing a 13-ethyl-11-oxygenated gonene, specifically 13-ethyl-11α,17β-dihydroxygon-5(10)-en-3-one.

Figure 3:
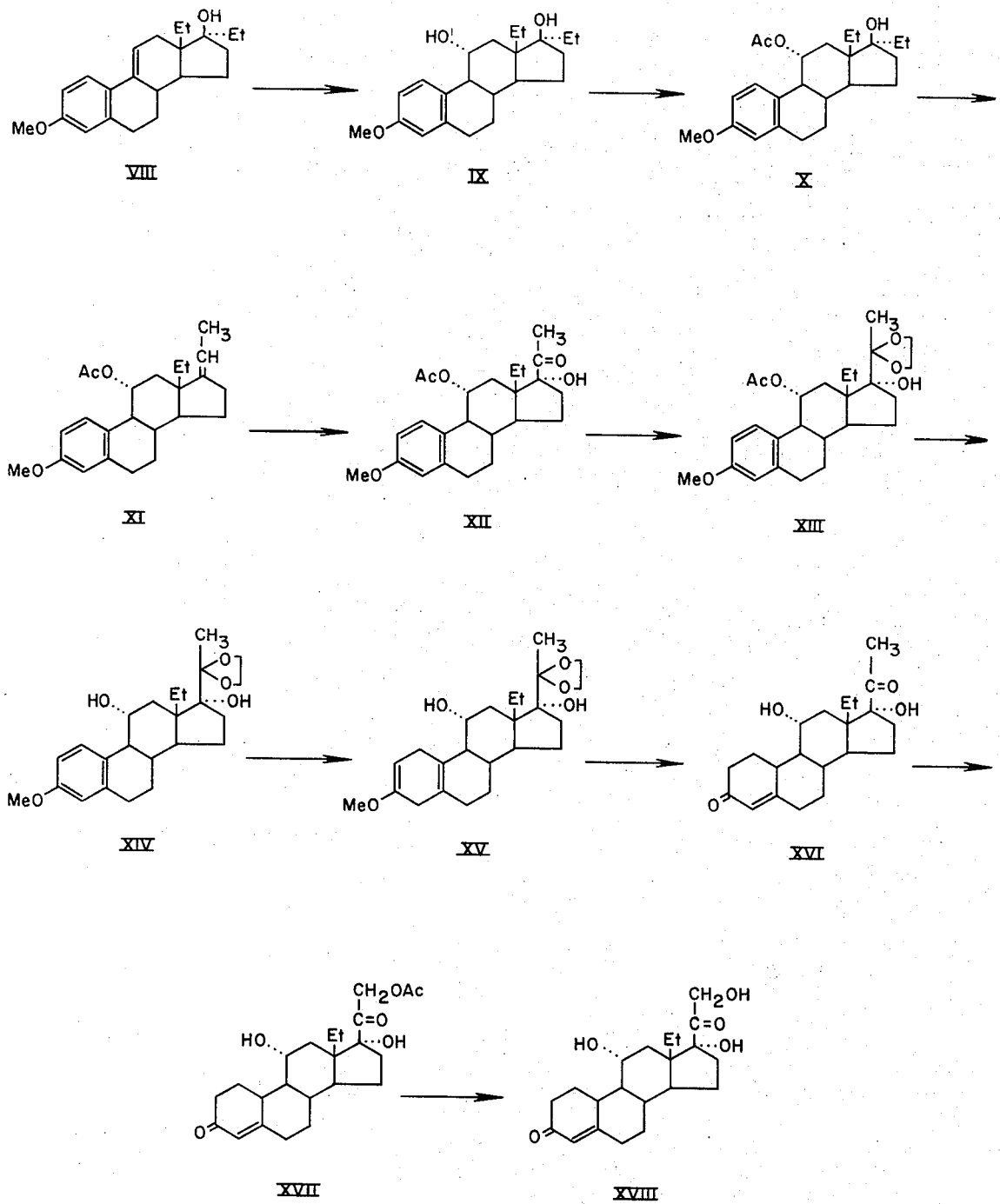
FIG. 3 illustrates the reaction sequence for preparing a 13-ethyl-11-oxygenated gonene, specifically 13-ethyl-11α,17α-dihydroxy-17β-hydroxyacetylgon-4-en-3-one.

The 11-position oxygenated functional group is represented by α- or β-hydroxy, or keto, in the compounds of the invention. Other oxygenated functional groups, such as a ketal group, an ether group, or a hydroxy group esterified with an acid such as acetic acid, propionic acid, valeric acid, caproic acid, phenylpropionic acid, cyclopentyl-propionic acid, or benzoid acid, may be present in lieu of the hydroxy or keto group and can be prepared from the 11-hydroxy or 11-keto in known manner.

The invention sought to be patented in a principal composition aspect is described as residing in the concept of a 13-ethyl-11-oxygenated-gon-5(10)-en-3-one.

The tangible embodiments of said principal composition aspect possess the applied use characteristic of exerting an adrenal-corticoid type activity as evidenced by pharmacological evaluation according to standard test procedures. Such tangible embodiments are therefore useful in those areas where corticoids have therapeutic potential.

The invention sought to be patented in a second composition aspect is described as residing in the concept of a 13-ethyl-11-oxygenated-gon-4-en-3-one.

The tangible embodiments of said second composition aspect possess the applied use characteristic of exerting an adrenal-corticoid type activity as evidenced by pharmacological evaluation according to standard test procedures. Such tangible embodiments are therefore useful in those areas where corticoids have therapeutic potential. For example, the compound 13-ethyl-11β,17α-dihydroxy-17β-hydroxyacetylgon-4-en-3-one and its 21-lower alkanoyl esters have antiinflammatory and antiallergic activities.

The invention sought to be patented in a third composition aspect is described as residing in the concept of a 13-ethyl-11-oxygenated-gona-2,5(10)-diene.

The tangible embodiments of said third composition aspect possess the applied use characteristic of being intermediates for the preparation of compositions exerting hormonal effects as evidenced by standard test procedures.

The manner and process for making and using the invention will now be generally described so as to enable a person skilled in the art of chemistry to make and use the same as follows:

Referring now to FIG. 1, the sequence of reactions involved in the synthesis of an intermediate, namely 13-ethyl-gona - 1,3,5(10) - triene-3,11α,17β-triol (III), is illustrated, 13 - ethylgona-1,3,5(10),9(11)-tetraene-3,17β-diol (I) is dissolved in acetic anhydride and pyridine, and heated at about 100° for about an hour. The solvents are removed by distillation under reduced pressure and the residue crystallized to obtain the diacetate, 13-ethyl-3,17β-diacetoxygona-1,3,5(10),9(11)-tetraene (II). This diacetate is dissolved in dry tetrahydrofuran and treated with excess diborane, generated by adding a solution of sodium borohydride in diglyme to a solution of boron trifluoride etherate in diglyme. The reaction mixture is maintained at room temperature for a period of a few hours and then water is cautiously added to decompose the excess diborane. Hydrogen peroxide and aqueous sodium hydroxide are added and the mixture is refluxed for about a half hour. After evaporation of solvent and acidification with hydrochloric acid, the product (III) is isolated by means of conventional acid-base extraction procedures and recrystallization from methanol at —5°.

Suitable solvents for the hydroboration reaction are ethers, and include tetrahydrofuran, diethyl ether, and diglyme (dimethyl ether of diethyleneglycol).

The diborane reactant can be passed into the reaction vessel by means of a gas inlet tube or generated in situ. The latter alternative is accomplished by the use of one of the alkali metal borohydrides or aluminum hydrides in conjunction with a reagent such as aluminum trichloride, boron trifluoride, or boron trichloride. A preferred combination is sodium borohydride and boron trifluoride etherate, dissolved in diglyme.

Referring now to FIG. 2, the sequence of reactions involved in the synthesis of a specific embodiment, namely 13-ethyl-11α,17β-dihydroxygon-5(10)-en-3-one (VII), is illustrated. 13-ethyl - 3 - methoxygona-1,3,5(10),9(11)-tetraen - 17 - one (IV), dissolved in tetrahydrofuran, is treated with diborane, and the resulting organoborane oxidized with alkaline peroxide. Conventional work-up and recrystallization from ether yield 13-ethyl-3-methoxygona-1,3,5(10)-triene - 11α,17β - diol (V). Reduction of the aromatic A-ring with an alkali metal and alcohol in liquid ammonia (Birch reduction) results in the formation of 13 - ethyl-3-methoxygona-2,5(10)-diene-11α,17β-diol (VI). The product (VII) is then obtained by hydrolysis with a weak acid such as oxalic acid or acetic acid. Hydrolysis with a strong mineral acid such as hydrochloric acid results in the formation of the corresponding gon-4-en-3-one.

Referring now to FIG. 3, the sequence of reactions involved in the synthesis of another specific embodiment, namely 13-ethyl-11α,17α-dihydroxy - 17β - hydroxyacetylgon-4-en-3-one (XVIII) is illustrated. 13,17α-diethyl-3-methoxygona-1,3,5(10),9(11) - tetraen-17β-ol (VIII) is treated with excess diborane and the product oxidized with alkaline peroxide to give 13,17α-diethyl-3-methoxygona-1,3,5(10)-triene-11α,17β - diol (IX). Esterification with acetic anhydride in pyridine affords the 11α-acetate (X), which is dehydrated by treating with thionyl chloride in pyridine at low temperature to afford 13-ethyl-11α-acetoxy-17-ethylidine - 3 - methoxygona-1,3,5(10)-triene (XI). This compound, dissolved in tert-butanol containing pyridine and a catalytic amount of osmium tetroxide is treated with triethylamine oxide peroxide by slowly adding the reagent in portions during 48 hours. By stirring the reaction mixture with aqueous sodium sulfite and extracting with methylene chloride, there is obtained, after chromatographic purification, 13-ethyl-11α-acetoxy-17β-acetyl-3-methoxygona-1,3,5(10)-trien-17α-ol (XII) which is converted by conventional treatment with ethylene glycol and p-toluenesulfonic acid in refluxing benzene to the ketal (XIII). Reduction with lithium aluminum hydride then gives 13-ethyl-17-(1-ethylenedioxyethyl) - 3 - methoxygona-1,3,5(10)-triene - 11α,17α - diol (XIV), which on Birch reduction with lithium and ethanol in liquid ammonia gives the enol-ether (XV), hydrolyzed by treatment with 10% aqueous sulfuric acid in methanol to 13-ethyl-17-acetyl-11α,17α-dihydroxygon-4-en-3-one (XVI). This product is acetoxylated by dissolving it in tetrahydrofuran and methanol and treating the solution with iodine in the presence of calcium oxide and a catalytic amount of azobisisobutyronitrile, followed by refluxing the crude reaction product with potassium acetate in acetone to obtain the acetoxydiol (XVII). This compound is dissolved in methanol and treated with aqueous potassium bicarbonate to yield, after conventional work-up, 13-ethyl-17β-hydroxyacetyl-11α,17α-dihydroxygon-4-en-3-one (XVIII).

It will be apparent to one skilled in the art of chemistry that the 11α-hydroxy-13-ethylgonenes can be subjected to a variety of conventional reactions. For example, the 11α-hydroxy group can be oxidized to a keto group by means of chromic acid. Subsequent reduction with a conventional reagent such as lithium aluminum hydride or sodium borohydride reduces the keto group to a β-hydroxy group. Thus 11α- and 11β-hydroxy compounds are made available. A secondary hydroxy group at the 17-position can similarly be oxidized.

Any hydroxy groups on the gonane nucleus can be esterified. Acetylation by means of acetic anhydride is readily accomplished. Benzoyl derivatives are prepared by treatment of the alcoholic group with benzoyl chloride. Among the other esterifications that can be performed are those utilizing as acids propionic acid, valeric acid, caproic acid, phenylpropionic acid, or cyclopentylpropionic acid. All of these conventional variations of the 13-ethyl-11-hydroxygonatriene or gonene nuclei are within the scope of the present invention and are the full equivalents of the 13-ethyl-11-hydroxygonatriene and gonene compounds specifically claimed.

The hydroboration reaction is best performed on 13-ethylgonenes which do not possess an active hydrogen atom. Such an active hydrogen, if present, would react rapidly with diborane by extraction of a hydride ion therefrom. Furthermore, the alkaline peroxide oxidation of the organoborane to an alcohol would be affected by an activated, or acidic hydrogen. For these reasons, the 3-hydroxy group which may be present on the starting material for the hydroboration reaction is protected by esterification or etherification. There can be, however, any of a variety of alkoxy, acyloxy, or cyclopentyloxy, and the cyclo hexyloxy groups. There can also be a hydrogen atom at any and all of these positions.

It will also be apparent to one skilled in the art of chemistry that there can be other variants in the starting materials which result in 11-hydroxygonatrienes or gonenes bearing the corresponding variants. For example, there can be at the 6- or 7-positions a lower alkyl group such as methyl or ethyl. By utilizing as starting materials 13-ethyl-6- or 7-lower alkylgona-1,3,5(10,9(11)-tetraenes, and subjecting them to the hydrocarbonation and oxidation sequence, there are formed 13-ethyl-6- or 7-lower alkyl-11α-hydroxygonatrienes, which can be further treated to yield 13-ethyl-6- or 7-lower alkyl-11-hydroxygon-4-en-3-ones or gon-5(10)-en-3-ones. Instead of the 13-ethyl group, there can be other polycarbon lower alkyl groups such as propyl, isopropyl, butyl, or pentyl. A further possible point of variation is in the D-ring. Instead of the normal 5 membered D-ring, there can be a 6-membered homologated D-ring. It is thus apparent that by using as a starting material the appropriate gona-1,3,5(10),9 (11)-tetraene, there can be produced 11-hydroxygona-1, 3,5(10)-trienes, 11α-hydroxygon-4-en-3-ones and 11-hydroxygon-5(10)-en-3-ones having any of the above-mentioned variations. Compounds having any of these variations are the full equivalents of the 13-ethyl-11-hydroxygonatrienes and gonenes specifically claimed.

If the hydroboration reaction is performed using a 13-ethylgona-1,3,5(10),9(11),16-pentaene as starting material instead of a 13-ethylgona-1,3,5(10),9(11)-tetraene, reaction occurs at the 16-position as well as at the 11-position. Subsequent oxidation results in the formation of 13-ethyl compounds having hydroxy groups at the 11 and 16-positions. Such 16-hydroxylated compounds are the full equivalents of the compounds specifically claimed.

The 13-ethylgona-1,3,5(10),9(11)-tetraene starting materials for the present invention are prepared by methods described in our copending U.S. patent application Ser. No. 228,394, filed Oct. 4, 1962, and U.S. patent application Ser. No. 488,936, now U.S. Pat. 3,391,170, filed Sept. 21, 1965. Such methods consist of the acid-catalyzed isomerization of the corresponding 13-ethyl-gona-1,3,5(10),8-tetraene or the ring-closure of a 13-ethyl-9,10-secogona-1,3,5(10)-triene-9-one.

The compositions of this invention are formulated for pharmaceutical use as solid capsules, tablets, suppositories, etc. by combining them with conventional carriers. Such conventional solid carriers include magnesium carbonate, magnesium stearate, talc, sugar, lactose, dextrin, pectin, starch, gelatin, tragacanth, methylcellulose, and sodium carboxymethylcellulose. Diluents, flavoring agents, solubilizers, lubricants, suspending agents, binders, or tablet-disintegrating agents may be employed. Liquid preparations such as solutions, suspensions or emulsions may also be prepared. A water-propylene glycol solution may be used for parenteral injection. An aqueous suspension suitable for oral use can be made by utilizing natural or synthetic gums, resins, methylcellulose, or other well-known suspending agents.

The following examples set forth the best mode contemplated by the inventors of carrying out their invention.

EXAMPLE 1

13-ethylgona-1,3,5(10),9(11)-tetraene-3,17β-diol, diacetate

Dissolve 20.8 g. of 13-ethylgona-1,3,5(10),9(11)-tetraene-3,17β-diol in 80 ml. of acetic anhydride and 40 ml. of pyridine. Maintain at 100° C. for 75 minutes. Evaporate the solvents in vacuo to obtain a red oil, which crystallizes on standing. Dissolve the resulting solid in benzene, filter through 200 g. of Florisil, and wash with 2 l. of benzene. Evaporate the benzene to obtain 22.5 g. of the title product, M.P. 146–147° C.

EXAMPLE 2

13-ethylgon-1,3,5(10)-trien-3,11α,17β-triol

Dissolve 22.5 g. of 13-ethylgona-1,3,5(10),9(11)-tetraene-3,17β-diol, diacetate in dry tetrahydrofuran (250 ml.) and treat with diborane (produced by adding 6 g. of sodium borohydride in 100 ml. of digylme to 42 ml. of boron trifluoride etherate in 66 ml. of diglyme) at room temperature over a period of three hours. Allow the mixture to remain at room temperature overnight and then decompose the excess diborane by the addition of water. Add 144 ml. of 30% hydrogen peroxide and 200 ml. of 2.5 N aqueous sodium hydroxide and reflux gently for 30 minutes. Evaporate the tetrahydrofuran in vacuo, acidify the residue with hydrochloric acid, extract the aqueous solution with two 600 ml. portions of ether, wash the ether extracts with potassium bicarbonate solution and brine, and dry over sodium sulfate. Evaporate the solvent in vacuo to obtain 14 g. of a yellow oily solid. Triturate with 50 ml. of ether and filter off the resulting solid (6 g.).

Recrystallize this material from 70 ml. of methanol at −5° C. to obtain 2.5 g. of the title product as a white solid, M.P. 165° as a cloudy melt, clearing by 175°. Combine the mother liquors from the trituration and recrystallization and evaporate the solvents. Chromatograph the residue (12.2 g.) on 750 g. of Florisil as follows: elute 86 mg. of oil with 500 ml. benzene-methanol (19:1); elute 4.5 g. of 13-ethylgona-1,3,5(10)-triene-3,9α,17β-triol with 1400 ml. of benzene-methanol (19:1); elute 887 mg. of a mixture of alcohols with 800 ml. of benzene-methanol (19:1); elute the title product with 1600 ml. of benzene-methanol (19:1) and 1 l. of benzene-methanol (9:1). Recrystallize the last fraction as above to obtain 3.25 g. pure title product.

EXAMPLE 3

13-ethylgona-1,3,5(10)-triene-3,11α,17β-triol, triacetate

Dissolve 49.4 mg. of 13 - ethylgona-1,3,5(10)-triene-3,11α,17β-triol in 0.25 ml. of pyridine and 0.25 ml. of acetic anhydride and maintain at 100° for 1.5 hours. Evaporate the solvents in vacuo and recrystallize the residue from 2 ml. of ethanol to obtain 46 mg. of the title product as white needles, M.P. 153.5–154.5°.

Analysis.—Calc'd for $C_{25}H_{32}O_6$ (percent): C, 70.07; H, 7.53; O, 22.48. Found (percent): C, 69.91; H, 7.60; O, 22.49.

EXAMPLE 4

13-ethylgona-1,3,5(10)-triene-3,11α,17β-triol, tribenzoate

Dissolve 46.8 mg. of 13 - ethylgona 1,3,5(10)-triene-3,11α,17β-triol in 0.1 ml. of warm benzoyl chloride and 0.4 ml. of pyridine. Allow to stand for 3 days. Add 10 ml. of water and triturate. Filter off the solid and recrystallize from 30 ml. alcohol-acetone (10:1) to obtain 69.4 mg. of title product as fine white needles, M.P. 243–245°.

Analysis.—Calc'd for $C_{40}H_{38}O_6$ (percent): C, 78.15; H, 6.23. Found (percent): C, 78.40; H, 6.17.

EXAMPLE 5

13-ethylgona-1,3,5(10)-triene-3,11α,17β-triol, 3 benzoate

Dissolve 1.1 g. of 13 - ethylgona - 1,3,5(10)-triene-3,11α,17β-triol in 35 ml. of 2.6 N sodium hydroxide at 10° and treat with 4 ml. of benzoyl chloride. Shake vigorously for 30 minutes. Add 10 ml. of ether, shake for a further 5 minutes, and extract the separated aqueous layer with 70 ml. of ether. Wash the combined ether extracts, dry, and evaporate in vacuo to obtain an oil, which crystallizes to 1.45 g. of the title product, M.P. 184–187.5°. Recrystallize from benzene to obtain the pure sample, M.P. 191–192°.

Analysis.—Calc'd for $C_{26}H_{30}O_4$ (percent): C, 76.82; H, 7.55. Found (percent) C, 77.17; H, 7.50.

EXAMPLE 6

13-ethyl-3-hydroxygona-1,3,5(10)-triene-11,17-dione, benzoate

Dissolve 431 mg. of 13 - ethylgona-1,3,5(10)-triene-3,11α,17β-triol benzoate in 30 ml. of acetone. Treat this solution dropwise with 4 N chromic acid in sulfuric acid (Jones reagent half strength) until a permenent brown color remains in the supernatant liquid (1.25 ml. added). Allow to stand for about an hour, add 50 ml. of water, and extract with 100 ml. and 40 ml. of ether. Wash the combined ether extracts with aqueous potassium carbonate and brine and dry. Evaporate to obtain an oil which solidifies. Recrystallize from about 5 ml. of ethanol to obtain 198 mg. of the title product, M.P. 151.5–155°; ultraviolet absorptions at 231 mμ (ε 18,250), 272 mμ (ε 3,540), and 281 mμ (ε 2,200). A further recrystallization from ethanol yields an analytical sample, M.P. 154.5–155°.

Analysis.—Calc'd for $C_{26}H_{26}O_4$ (percent): C, 77.59; H, 6.51. Found (percent): C, 77.25; H, 6.33.

EXAMPLE 7

13-ethyl-3,11-dihydroxygona-1,3,5(10),9(11)-tetraen-17-one, 3-benzoate, 11-acetate Reflux 86.4 mg. of 13 - ethyl-3-hydroxygona-1,3,5(10)-triene-11,17-dione benzoate in 1 ml. of pyridine and 1 ml. of acetic anhydride for three hours. Evaporate the solvents in vacuo and dissolve the residual brown oil in ether. Wash, dry, and evaporate the ether and crystallize the residue with 20 ml. of ethanol to obtain 57.7 mg. of the title product, M.P. 206.5–208°. Obtain a pure sample, M.P. 208.5–209°, by recrystallization from ethanol.

Analysis.—Calc'd for $C_{28}H_{28}O_5$ (percent): C, 75.65; H, 6.35. Found (percent): C, 75.48; H, 6.32.

EXAMPLE 8

13-ethylgona-1,3,5(10)-triene-3,11β,17β-triol

Treat a solution of 328 mg. of 13-ethyl-3-hydroxygona-1,3,5(10)-triene-11,17-dione benzoate in absolute alcohol with 499 mg. of sodium borohydride and reflux for two hours. Evaporate the solvent in vacuo, treat the resulting white solid with 50 ml. of water, acidify with dilute hydrochloric acid, and extract twice with 75 ml. of ether. Wash the combined ether extracts with aqueous potassium carbonate and brine, dry, and evaporate to obtain an oily solid. Recrystallize from about 5 ml. of ethanol at −5° to obtain 125 mg. of the title product, M.P. 232–7° d. A further recrystallization from ethanol yields an analytical sample, M.P. 237–41°.

Analysis.—Calc'd for $C_{19}H_{26}O_3$ (percent): C, 75.46; H, 8.67. Found (percent): C, 75.94; H, 8.94.

EXAMPLE 9

13-ethylgona-1,3,5(10)-triene-3,11β,17β-triol, 3 benzoate

Dissolve 241 mg. of 13-ethylgona-1,3,5(10)-triene-3,11β,17β-triol in 13 ml. of 2.13 N aqueous caustic soda, treat the solution with 1 ml. of benzoyl chloride, and shake vigorously for 15 minutes. Extract the product successively with ether, benzene, and ethyl acetate and evaporate the solvents to obtain 181 mg. of the title product as a white solid.

EXAMPLE 10

13-ethyl-3-methoxygona-1,3,5(10)-triene-11α,17β-diol

Into a solution of 20 g. of 13-ethyl-3-methoxygona-1,3,5(10),9(11)-tetraen-17-one in 100 ml. of dry tetrahydrofuran bubble diborane, generated by adding a solution of 5.0 g. of sodium borohydride in 110 ml. of diglyme to 37.5 ml. of boron trifluoride etherate in 115 ml. of diglyme, over a period of two hours. Allow the mixture to stand for 48 hours and then cautiously add about 10 ml. of water to decompose the excess borane. Then add 115 ml. of 30% hydrogen peroxide and 165 ml. of 2 N sodium hydroxide and reflux for half an hour. Evaporate the tetrahydrofuran in vacuo, extract the aqueous solution with 600 ml. of ether, wash with brine, and dry. Evaporate the ether solution to about 80 ml. Upon standing, the title product crystallizes (9.7 g.). Recrystallize from ether to obtain an analytical sample, M.P. 165–167°. A second crystalline form of the compound melts at 131.5–132°.

*Analysis.*—Calc'd for $C_{20}H_{28}O_3$ (percent): C, 75.91; H, 8.92; Found (percent): C, 75.78; H, 8.63.

EXAMPLE 11

13-ethyl-3-methoxygona-1,3,5(10)-triene-11,17-dione

Mix a solution of 13-ethyl-3-methoxygona-1,3,5(10)-triene-11α,17β-diol in toluene and cyclohexanone with freshly distilled aluminum isopropoxide and reflux under nitrogen for four hours. Cool and filter off the solid. Wash the filtrate, dry, and evaporate to obtain the title product.

EXAMPLE 12

13-ethyl-3-methoxygona-1,3,5(10)-triene-11β,17β-diol

Dissolve 13 - ethyl-3-methoxygona-1,3,5(10)-triene-11,17-dione and ethanol and reduce with sodium borohydride by refluxing for two hours. Evaporate the solvent in vacuo, add water, acidify with dilute hydrochloric acid, and extract with ether. Wash, dry, and evaporate the ether extracts to obtain the title product.

EXAMPLE 13

13-ethyl-3-methoxygona-2,5(10)-diene-11β,17β-diol

Dissolve 86 mg. of 13-ethyl-3-methoxygona-1,3,5(10)-triene-11β,17β-diol in 10 ml. of dry tetrahydrofuran and 30 ml. of liquid ammonia (distilled from sodium), and keep the solution at −40° to −25°. Treat with 326 mg. of lithium, stir, and add 4.2 ml. of ethanol dropwise over a period of 35 minutes. Allow the ammonia to evaporate at room temperature, quench with water, and extract with ether (2× 75 ml.). Wash the extracts, dry and evaporate to obtain 78 mg. of the product.

EXAMPLE 14

13-ethyl-11β,17β-dihydroxygon-4-en-3-one

Stir 69 mg. of 13-ethyl-3-methoxygona-2,5(10)-diene-11β,17β-diol with 0.1 ml. of conc. hydrochloric acid, 2 ml. of methanol, and 0.054 ml. of water for 2½ hours at room temperature. Then add 20 ml. of water and extract with 2× 75 ml. of ethyl acetate. Wash, dry, and evaporate the extracts to obtain 80 mg. of product. Recrystallize from ethyl acetate to obtain a pure sample, M.P. 197.5–198.5°.

EXAMPLE 15

13-ethyl-3-methoxygona-2,5(10)-diene-11,17-dione

Mix a solution of 2.0 g. of 13-ethyl-3-methoxygona-2,5(10)-diene-11α,17β-diol in 144 ml. of toluene and 40 ml. of cyclohexanone with 2.0 g. of freshly distilled aluminum isopropoxide, and reflux under nitrogen for four hours. Cool and filter off the yellow solid. Wash the filtrate, dry, and evaporate at 100°/0.5 mm. to obtain the title product.

EXAMPLE 16

13-ethyl-3-methoxygona-1,3,5(10)-triene-11α,17β-diol, diacetate

Dissolve 252 mg. of 13-ethyl-3-methoxygona-1,3,5(10)-triene-11α,17β-diol in 2 ml. of pyridine and 2 ml. of acetic anhydride and maintain the solution at 100° for one and one-half hours. Evaporate the solvents in vacuo, dissolve the resulting oil in benzene, and crystallize the residual oil with 4 ml. of ethanol to obtain 239 mg. of the title product, M.P. 130.5–131.5°.

*Analysis.*—Calc'd for $C_{24}H_{32}O_5$ (percent): C, 71.97; H, 8.05. Found (percent): C, 71.72; H, 7.92.

EXAMPLE 17

13-ethyl-3-methoxygona-2,5(10)-diene-11α,17β-diol

Dissolve 7.5 g. of 13-ethyl-3-methoxygona-1,3,5(10)-triene-11α,17β-diol in 200 ml. of dry tetrahydrofuran and 300 ml. of liquid ammonia (distilled from sodium). To this stirred solution add 4.73 g. of lithium, maintain the resulting blue solution at −30°, and treat dropwise with 57 ml. of ethanol over a period of one and one-half hours. After allowing the mixture to stand at room temperature overnight, quench with 1.5 l. of water and extract with 1.5 l. of ether. Wash the ether extract with brine, dry, and evaporate to obtain 7.5 g. of the title product. A sample recrystallized from ethanol melted at 201–6°.

EXAMPLE 18

13-ethyl-11α,17β-dihydroxygon-4-en-3-one

Stir at room temperature a mixture of 4.65 g. of 13-ethyl-3-methoxygona-2,5(10)-diene - 11α,17β - diol, conc. hydrochloric acid and 2 ml. of water for two and one-half hours after which time all the solid should have gone into solution. Quench the solution with 600 ml. of water and extract with 250 ml. and 400 ml. of ethyl acetate. Wash the combined extracts with brine, dry, and evaporate under partial vacuum to a volume of about 50 ml. Allow the product to crystallize at room temperature. Filter off 2.55 g. of the title product, M.P. 206–10°. Recrystallize from ethyl acetate to obtain an analytical sample, M.P. 214.5–217°, ultraviolet absorption at 241 mμ (ε 13,700).

*Analysis.*—Calc'd for $C_{19}H_{28}O_3$ (percent): C, 74.96; H, 9.27. Found (percent): C, 74.56; H, 9.52.

EXAMPLE 19

13-ethylgon-4-ene-3,11,17-trione

Dissolve 953 mg. of 13-ethyl-11α,17β-dihydroxygon-4-en-3-one in 100 ml. of warm analar acetone and cool to 15°. Add dropwise with stirring 3.5 ml. (10% excess) of 4 N chromic acid in sulfuric acid and water (Jones reagent, half strength). Maintain at room temperature for ten minutes and then treat with 200 ml. of water. Evaporate the acetone at room temperature in vacuo and extract the oily product with ether. Wash the ether extracts with aqueous potassium bicarbonate and brine, dry, and evaporate to obtain a 793 mg. residue. Crystallize this residue from 5 ml. of ethanol to obtain 558 mg. of the title product, M.P. 163.5–165°, ultraviolet absorption at 239 mμ (ε 14,450).

EXAMPLE 20

13-ethyl-11α,17β-dihydroxygon-5(10)-en-3-one

Stir a mixture of 109 mg. of 13-ethyl-3-methoxygona-2,5(10)-diene-11α,17β-diol in 7.5 mg. of methanol, 1.3 ml. of water, and 130 mg. of oxalic acid dihydrate for two and one half hours, during which time complete solution is attained. Add about 50 ml. of water, extract twice with 40 ml. of ether, wash the ether extracts with brine, and dry. Evaporate the solution to obtain 97 mg. of a white product. Recrystallize from 5 ml. of ethyl acetate to obtain 46 mg. of the title product, M.P. 207–12°.

*Analysis.*—Calc'd for $C_{19}H_{28}O_3$ (percent): C, 74.96; H, 9.27. Found (percent): C, 74.68; H, 9.19.

EXAMPLE 21

13-ethylgona-1,3,5(10),9(11),16-pentaene-3,17-diol, diacetate

Mix a solution of 2.04 g. of 13-ethyl-3-hydroxygon-1,3,5(10),9(11)-tetraen-17-one acetate in 50 ml. of isopropenylacetate with 600 mg. of p-toluenesulfonic acid and heat on a steam bath. Remove portions (2× 3 ml.) of solvent by distillation after two and four hours and maintain the mixture at 100° overnight. Reduce the volume to about 20 ml. by slow distillation through a short column over a period of six hours under a pressure of about 600 mm. Add 70 ml. of ether, wash the resulting solution with aqueous potassium bicarbonate and brine, and dry. Evaporate the solvent to obtain 2.37 g. of a red oil. Dissolve this oil in benzene and chromatograph on 150 g. of Florisil as follows: elute 232 mg. of a colorless oil with 990 ml. of benzene; elute 1.17 g. of the title product as a pale yellow solid with 2 l. of benzene and 200 ml. of benzene-ether (49:1). Recrystallize 327 mg. of the latter product from 8 ml. of ethanol to obtain 250 mg. of compound, M.P. 150–1°.

*Analysis.*—Calc'd for $C_{23}H_{26}O_4$ (percent): C, 75.38; H, 7.15. Found (percent): C, 75.41; H, 7.19.

EXAMPLE 22

13-ethylgona-1,3,5(10)-triene-3,11α,16α,17β-tetrol

Into a solution of 3.95 g. of 13-ethylgona-1,3,5(10),9(11),16-pentaene-3,17β-diol, diacetate in 150 ml. of dry tetrahydrofuran bubble diborane (generated by adding 1.24 g. of sodium borohydride in 30 ml. of diglyme to 10 ml. of boron trifluoride etherate in 20 ml. of diglyme) over a period of two hours at room temperature overnight. Add 20 ml. of water cautiously to decompose the excess diborane and treat the resulting homogeneous solution with 30 ml. (100 volume) of hydrogen peroxide and 42 ml. of 2 N sodium hydroxide. Reflux for one half hour, evaporate the tetrahydrofuran in vacuo, and acidify the resulting aqueous solution with 10 ml. conc. hydrochloric acid. Extract with 3 100 ml. portions of ethyl acetate, wash with aqueous potassium bicarbonate and brine, dry and evaporate in vacuo to obtain a solid. Triturate with hot acetone, cool, and filter to obtain 1.09 g. of crude product, M.P. 249–54° d. Recrystallize 449 mg. from 10 ml. of ethanol to obtain 299 mg. of product, M.P. 256–8°.

*Analysis.*—Calc'd for $C_{19}H_{26}O_4$ (percent): C, 71.67; H, 8.23. Found (percent): C, 71.79; H, 8.14.

EXAMPLE 23

13-ethylgona-1,3,5(10)-triene-3,11α,16α,17β-tetrol tetraacetate

Dissolve 154 mg. of 13-ethylgona-1,3,5(10)-triene-3,11α,16α,17β-tetrol in 3 ml. of acetic anhydride and 3 ml. of pyridine and heat at 180° for one and one-half hours. Evaporate the solvents in vacuo to obtain the title product, M.P. 104°.

*Analysis.*—Calc'd for $C_{27}H_{34}O_8$ (percent): C, 66.65; H, 7.04. Found (percent): C, 66.72; H, 6.98.

EXAMPLE 24

13β,17α-diethyl-3-methoxygona-1,3,5(10)-triene-11α,17β-diol

Pass diborane, generated by slowly adding a solution of sodium borohydride (9.33 g.) in diethyleneglycol dimethyl ether (300 ml.) to a solution of boron trifluoride etherate (41.2 ml.) in diethyleneglycol dimethyl ether (100 ml.), into a solution of 13β,17α-diethyl-3-methoxygona-1,3,5(10),9(11)-tetra-en-17β-ol (6.5 g.) in tetrahydrofuran (200 ml.) in an atmosphere of nitrogen. Allow the solution to stand at 25° for 24 hours, and cautiously add water (6 ml.) followed by sodium hydroxide (14 g.) in water (100 ml.) and 30% hydrogen peroxide (100 ml.). Reflux for 20 minutes, cool, and separate the organic layer. Extract the aqueous layer with tetrahydrofuran (200 ml.), and wash the combined organic layers with brine until neutral and dry. Evaporate the solvent, and chromatograph the residue on Florisil (280 g.), eluting with benzene containing increasing portions of ether to obtain two crystalline fractions. Recrystallize the second fraction (5.09 g.) from acetone-light petroleum to obtain the title compound (3.1 g.), M.P. 165–6°.

*Analysis.*—Calc'd for $C_{22}H_{32}O_3$ (percent): C, 76.70; H, 9.36. Found (percent): C, 76.71; H, 9.33.

EXAMPLE 25

11α-acetoxy-13β,17α-diethyl-3-methoxygona-1,3,5(10)-trien-17β-ol

Allow 13β,17α-diethyl-3-methoxygona-1,3,5(10)-triene-11α,17β-diol (18.6 g.) in pyridine (140 ml.) and acetic anhydride (270 ml.) to stand at 25° for 16 hours. Pour the reaction mixture into ice-water and add sodium bicarbonate with stirring until effervescence ceases. Extract with ether and wash the organic solution with 10% hydrochloric acid, aqueous sodium bicarbonate, water and brine, and dry. Evaporate the solvent and recrystallize the residue from methanol to obtain the title compound (15.97 g.), M.P. 170–1°; infrared absorption peak at 2.8μ.

*Analysis.*—Calc'd for $C_{24}H_{34}O_4$ (percent): C, 74.57; H, 8.87. Found (percent): C, 74.52; H, 8.76.

EXAMPLE 26

13β-ethyl-3-methoxy-11α-acetoxy-17-ethylidenegona-1,3,5(10)-triene

Treat 11α-acetoxy-13β,17α-diethyl-3-methoxygona - 1,3,5(10)-trien-17β-ol (5.12 g.) in dry pyridine (50 ml.) at —5° with redistilled thionyl chloride (1.66 g.) over 12 minutes and stir for a further 15 minutes at —5°. Pour into crushed ice, extract with ether and wash the organic extract with dilute hydrochloric acid, aqueous sodium bicarbonate, brine, and dry. Evaporate the solvent and chromatograph the residue on Florisil (100 g.) eluting with light petroleum containing 2% acetone to obtain the title compound as a glass (3.5 g.). The product can be crystallized with light petroleum, M.P. 97–101°.

*Analysis.*—Calc'd for $C_{24}H_{32}O_3$ (percent): C, 78.22; H, 8.75. Found (percent): C, 78.64; H, 8.82.

EXAMPLE 27

13β-ethyl-3-methoxy-17-ethylidenegona-1,3,5(10)-trien-11α-ol

Reflux 13β - ethyl-3-methoxy-11α-acetoxy-17-ethylidenegona-1,3,5(10)-triene (1.264 g.) with potassium hydroxide (0.5 g.) in methanol (15 ml.), tetrahydrofuran (10 ml.) and water (10 ml.) for one hour in an atmosphere of nitrogen. Evaporate to small volume and extract with ether. Wash, dry and evaporate the solvent and filter the residue through a column of Florisil (30 g.) with acetone-light petroleum (1:9) to obtain the title compound as a colorless gum (0.79 g.), ultraviolet absorption peak at 277 mμ (ε 1810).

*Analysis.*—Calc'd for $C_{22}H_{30}O_2$ (percent): C, 80.93; H, 9.26. Found (percent): C, 80.75; H, 9.28.

EXAMPLE 28

13-ethyl-17β-hydroxymethyl-3-methoxygona-1,3,5(10)-trien-11α-ol

Add methyl triphenylphosphonium bromide (100 g.) to a solution of phenyl lithium [prepared from phenyl bromide (58.5 g.) and lithium (5.1 g.) in ether (1750 ml.)] and stir the mixture at 25° for two hours. Add a solution of 13-ethyl-3-methoxygona-1,3,5(10),9(11)-tetraen-17-one (17.25 g.) in tetrahydrofuran (150 ml.) and ether (300 ml.), reflux for 30 minutes and slowly distil off ether (2500 ml.), adding tetrahydrofuran (1250 ml.) towards the latter part of the distillation. Stir under reflux for 48 hours, cool, filter and evaporate the filtrate. Extract the residue thoroughly with ether-light petroleum (1:1), then dissolve the residue in water and extract with the same solvent mixture. Wash the combined extracts with 5% hydrochloric acid, water, aqueous sodium bicarbonate, brine, and dry. Evaporate the solvent and dissolve the residue in light petroleum-benzene (4:1; 500 ml.), filtering off any insoluble material. Filter the solution through a column of neutral alumina (100 g.), washing the column with the same solvent mixture (500 ml.). Evaporate the combined eluates and recrystallize the residue from methanol to obtain 13-ethyl-17-methylene-3-methoxygona - 1,3,5(10),9(11)-tetraene (10.9 g.), M.P. 92–9°. Recrystallize from methanol to obtain pure material M.P. 104–8°. Pass diborane, generated by the addition of sodium borohydride (1.25 g.) in diethyleneglycol dimethyl ether (30 ml.) to boron trifluoride etherate (10 ml.) in diethylene glycol dimethyl ether (20 ml.) over 1½ hours into a stirred solution of 13-ethyl-17β-methylene-3-methoxygona-1,3,5(10),9(11) - tetraene (3.0 g.) in dry tetrahydrofuran (100 ml.). Heat the solution to 70° for one hour and allow to stand at 25° for 18 hours. Add water (20 ml.), followed by 2 N sodium hydroxide (40 ml.) and hydrogen peroxide (30%; 30 ml.) and reflux for 45 minutes. Evaporate the tetrahydrofuran under reduced pressure and acidify with dilute hydrochloric acid. Extract the mixture with ethyl acetate and wash, dry and evaporate the organic solution. Recrystallize the residue twice from methanol to obtain the title compound (1.326 g.), M.P. 184–6°; ultraviolet absorption peaks at 276 m$\mu$ ($\epsilon$ 1820) and 280 m$\mu$ ($\epsilon$ 1640).

EXAMPLE 29

13-ethyl-11α-acetoxy-17β-acetoxymethyl-3-methoxygona-1,3,5(10)-triene

Heat 13-ethyl - 17β - hydroxymethyl-3-methoxygona-1,3,5(10)-trien - 11α - ol (0.2 g.) with pyridine (5 ml.) and acetic anhydride (2 ml.) at 100° for one hour. Pour the cooled solution into aqueous sodium bicarbonate and extract with ether. Wash, dry and evaporate the organic solution and recrystallize the residue from ethanol to obtain the title compound, M.P. 110–111.5°; ultraviolet absorption peaks at 276 m$\mu$ ($\epsilon$ 1815) and 281 m$\mu$ ($\epsilon$ 1650).

EXAMPLE 30

13-ethyl-17β-(1-hydroxyethyl)-5-methoxygona-1,3,5(10)-trien-11α-ol

Add methanol (300 ml.) and concentrated hydrochloric acid (50 ml.) to a solution of 13,17α-diethyl-17β-hydroxy-3-methoxygona-1,3,5(10),9(11)-tetraene (20 g.) in tetrahydrofuran (200 ml.) and reflux for two hours. Evaporate to ¼ volume, add water and extract with ether. Wash, dry and evaporate the organic solution and recrystallize the residue twice from methanol to give 13-ethyl-17-ethylidene - 3 - methoxygona-1,3,5(10),9(11) - tetraene (5.24 g.), M.P. 117–121.5°. To a solution of this tetraene (3.34 g.) in tetrahydrofuran (200 ml.) containing sodium borohydride (5.55 g.) add a solution of boron trifluoride etherate (21 ml.) in tetrahydrofuran (40 ml.) dropwise over 1½ hours and stir for a further 18 hours. Add water (35 ml.), 2 N sodium hydroxide (70 ml.) and 30% hydrogen peroxide (115 ml.) and reflux with vigorous stirring for 1½ hours. Evaporate the tetrahydrofuran under reduced pressure and acidify the residue with dilute hydrochloric acid. Extract the mixture thoroughly with ether-ethyl acetate (1:1) and wash, dry and evaporate the organic extract. Chromatograph the residue on Florisil eluting with light petroleum containing increasing proportions of ether and combine and recrystallize the fractions eluted with light petroleum-ether (1:3) from ethyl acetate to obtain the title compound (1.82 g.), M.P. 169–170°; infrared absorption peaks at 2.72, 2.95$\mu$; ultraviolet absorption maxima at 276 m$\mu$ ($\epsilon$ 1545), 280 m$\mu$ ($\epsilon$ 1660).

*Analysis.*—Calc'd for $C_{22}H_{32}O_3$ (percent): C, 76.70; H, 9.36. Found (percent): C, 76.51; H, 9.43.

EXAMPLE 31

13-ethyl-11α-acetoxy-17β-(1-acetoxyethyl)-3-methoxygona-1,3,5(10)-triene

Heat 13-ethyl-17β-(1 - hydroxyethyl)-3-methoxygona-1,3,5(10)-trien-11α-ol (0.122 g.) in pyridine (1 ml.) and acetic anhydride (1 ml.) at 100° for 1 hour. Allow to stand for 18 hours and pour into ice-water. Extract with ether, wash, dry and evaporate the ethereal solution and recrystallize the residue from ethanol to obtain the title compound (0.0948 g.), M.P. 163–165°; ultraviolet absorption peaks at 276 m$\mu$ ($\epsilon$ 1825) and 281 m$\mu$ ($\epsilon$ 1605).

*Analysis.*—Calc'd for $C_{26}H_{36}O_5$ (percent): C, 72.86; H, 8.47. Found (percent): C, 73.01; H, 8.40.

EXAMPLE 32

13-ethyl-11α-acetoxy-17β-acetyl-3-methoxygona-1,3,5(10)-trien-17-ol

To a solution of 13-ethyl-3-methoxy-11α-acetoxy-17-ethylidenegona-1,3,5(10)-triene (0.482 g.) and osmium tetroxide (0.015 g.) in pyridine (0.4 ml.) and tert-butanol (25 ml.) add triethylamine oxide peroxide (1.46 g.) in small portions during 48 hours. Stir with excess aqueous sodium sulphite for 5 minutes and extract with methylene chloride. Wash, dry and evaporate the organic extracts and chromatograph the residue on Florisil (30 g.), eluting with light petroleum containing 12% acetone to obtain the title compound (0.167 g.). Recrystallize from aqueous methanol to obtain the pure product, M.P. 211–5°; infrared absorption peaks at 5.8, 5.83$\mu$.

*Analysis.*—Calc'd for $C_{24}H_{32}O_5$ (percent): C, 71.97; H, 8.05. Found (percent): C, 71.54; H, 8.34.

EXAMPLE 33

13-ethyl-11α-acetoxy-17α,20α-epoxy-3-methoxy-18,19-dinorpregna-1,3,5(10)-triene

Add a solution of m-chloroperbenzoic acid (0.494 g.) in benzbene (10 ml.) to a soltuion of 13-ethyl-3-methoxy-11α-acetoxy - 17 - ethylidenegona-1,3,5(10)-triene (0.494 g.) in benzene (5 ml.) and stir at 25° for 3 hours. Add ether and wash, dry and evaporate the solution. Recrystallize the residue twice from ether-light petroleum to obtain the title compound (0.099 g.), M.P. 144–147°.

*Analysis.*—Calc'd for $C_{24}H_{32}O_4$ (percent): C, 74.97; H, 8.39. Found (percent): C, 74.99; H, 8.55.

EXAMPLE 34

13-ethyl-11α-acetoxy-17β-(1-hydroxyethyl)-3-methoxygona-1,3,5(10)-trien-17-ol

Treat 13-ethyl-3-methoxy - 11α - acetoxy-17-ethylidenegona-1,3,5(10)-triene (2.85 g.) in tetrahydrofuran (50 ml.) and pyridine (5 ml.) with osmium tetroxide (2 g.) in tert-butanol (25 ml.) and allow the mixture to stand at 25° for 72 hours. Saturate the solution with hydrogen sulphide and filter the precipitate. Evaporate the filtrate and chromatograph the residue on Florisil (50 g.) eluting with light petroleum-acetone (9:1) to remove starting material. Elute with acetone to obtain a light brown solid. Recrystallize from methanol to obtain the title compound (1.84 g.), M. P. 258–265°.

EXAMPLE 35

13-ethyl-11α-acetoxy-17β-(1-acetoxyethyl)-3-methoxygona-1,3,5(10)-trien-17-ol

Allow 13-ethyl - 11α - acetoxy-17β-(1-hydroxyethyl)-3-methoxygona-1,3,5(10)-trien-17-ol (0.104 g.) in acetic anhydride (0.5 ml.) and pyridine to stand at 25° for 48 hours. Pour onto water, extract with ether and wash, dry and evaporate the ethereal solution. Recrystallize the product from methanol to obtain the title compound, M.P. 185–9°.

EXAMPLE 36

13-ethyl-17β-(1-hydroxyethyl)-3-methoxygona-1,3,5(10)-triene-11α,17-diol

Reflux a solution of 13-ethyl-11α-acetoxy-17β-(1-hydroxyethyl)-3-methoxygona-1,3,5(10)-trien-17-ol (0.208 g.) with potassium hydroxide (0.17 g.) in tetrahydrofuran (15 ml.) methanol (2 ml.) and water (2 ml.) for 1½ hours under a nitrogen atmosphere. Evaporate most of the solvent, add methylene chloride and wash, dry and evaporate the solution to obtain the crude title compound (0.155 g.). Recrystallize from methanol to obtain the pure compound, M.P. 218.5–225°.

*Analysis.*—Calc'd for $C_{22}H_{32}O_4$ (percent): C, 73.3; H, 8.95. Found (percent): C, 73.14; H, 9.17.

EXAMPLE 37

13-ethyl-11α-acetoxy-17β-(1-ethylenedioxyethyl)-3-methoxygona-1,3,5(10)-trien-17-ol Reflux 13-ethyl-11α-acetoxy-17β-acetyl-3-methoxygona-1,3,5(10)-trien-17-ol (1.87 g.) with p-toluenesulfonic acid (0.3 g.) and ethylene glycol (7 ml.) in benzene (100 ml.) under a Dean-Stark water separator for 16 hours. Wash the cooled solution with water, dry and evaporate and recrystallize the residue from ethyl acetate containing a little pyridine to obtain the title compound (1.55 g.), M.P. 194–6°.

*Analysis.*—Calc'd for $C_{26}H_{20}O_6$ (percent): C, 70.24; H, 8.16. Found (percent): C, 69.67; H, 8.36.

EXAMPLE 38

13-ethyl-17β-(1-ethylenedioxyethyl)-3-methoxygona-1,3,5(10)-triene-11α,17-diol

Add 13-ethyl-11α-acetoxy-17β-(1-ethylenedioxyethyl)-3-methoxygona-1,3,5(10)-trien-17-ol (1.47 g.) in benzene (60 ml.) to a suspension of lithium aluminum hydride in ether (120 ml.) and stir the mixture at 25° for 2 hours. Decompose excess reagent with water, dry and filter. Evaporate the filtrate and recrystallize the residue from ethyl acetate to obtain the title compound (1.068 g.), M.P. 194–5°.

*Analysis.*—Calc'd for $C_{24}H_{34}O_5$ (percent): C, 71.61; H, 8.51. Found (percent): C, 71.46; H, 8.42.

EXAMPLE 39

13-ethyl-17β-acetyl-3-methoxygona-1,3,5(10)-triene-11α,17-diol

Reflux 13-ethyl-17β-(1-ethylenedioxyethyl)-3-methoxygona-1,3,5(10)-triene-11α,17-diol (0.092 g.) in methanol (7 ml.) with 10% aqueous sulfuric acid (0.5 ml.) for 40 minutes. Add water and extract with methylene chloride. Wash, dry and evaporate the organic extract and recrystallize from methanol to obtain the title compound (0.042 g.), M.P. 103–7°.

*Analysis.*—Calc'd for $C_{22}H_{30}O_4 \cdot CH_3OH$ (percent): C, 70.74; H, 8.78. Found (percent): C, 70.89; H, 8.71.

EXAMPLE 40

13-ethyl-17α-(2-hydroxyethyl)-3-methoxygona-1,3,5(10)-triene-11α,17-diol

Hydrogenate 13-ethyl-17α-ethynyl-3-methoxygona-1,3,5(10),9(11)-tetraen-17β-ol (4.65 g.) in tetrahydrofuran (100 ml.) and pyridine (10 ml.) in the presence of 2% palladised calcium carbonate (0.5 g.) at atmospheric pressure until one molecular equivalent of hydrogen (565 ml. at 16° C.) has been absorbed. Filter, acidify the filtrate to pH 3 with dilute hydrochloric acid and filter the product. Dissolve the residue in methylene chloride and wash, dry and evaporate the solvent. Recrystallize the residue twice from methanol to obtain 13-ethyl-17α-vinyl-3-methoxygona - 1,3,5(10),9(11) - tetraen-17-ol (3.8 g.), M.P. 71–4°. Add a solution of N diborane in tetrahydrofuran (50 ml.) slowly to a solution of 13-ethyl-17α-vinyl-3-methoxygona-1,3,5(10),9(11)-tetraen-17-ol (3.078 g.) in dry tetrahydrofuran (100 ml.) and stir for 20 hours. Add water cautiously to destroy excess reagent followed by aqueous 2 N sodium hydroxide (30 ml.) and 30% hydrogen peroxide (30 ml.) and reflux for 2 hours with stirring. Evaporate the tetrahydrofuran under reduced pressure and extract with ethyl acetate. Wash and dry the organic extract and evaporate to a viscous gum. Chromatograph on Florisil (150 g.) eluting with light petroleum ether mixtures, ether, ether-methanol mixtures, and methanol. Recrystallize the solid eluted with ether-methanol from methanol to obtain the title compound (0.454 g.); ultraviolet absorption peak at 276 mμ (ε 1827).

EXAMPLE 41

13-ethyl-11α-acetoxy-17α-(2-acetoxyethyl)-3-methoxygona-1,3,5(10)-trien-17-ol

Allow 13-ethyl-17α-(2-hydroxyethyl)-3-methoxygona-1,3,5(10)-triene-11α,17-diol (0.122 g.) to stand in pyridine (1 ml.) and acetic anhydride (1 ml.) at 25° for 16 hours. Pour into water, extract with ether, and wash, dry and evaporate the organic extract. Recrystallize the residue from ethanol to obtain the title product (0.088 g.), M.P. 149–150°; ultraviolet absorption maximum at 276.5 mμ (ε 1832).

*Analysis.*—Calc'd for $C_{26}H_{36}O_6$ (percent): C, 70.24; H, 8.16. Found (percent): C, 70.16; H, 8.08.

EXAMPLE 42

13-ethyl-11α-acetoxy-17-acetoxyethylidene-3-methoxygona-1,3,5(10)-triene

Dissolve 13-ethyl-11α-acetoxy-17α-(2-acetoxyethyl)-3-methoxygona-1,3,5(10)-triene-17-ol (0.182 g.) in pyridine (2 ml.) and add thionyl chloride (0.03 ml.) at 0° with stirring. After 5 minutes add ice and extra with ether. Wash with water, dry and evaporate the ethereal solution to obtain the title compound (0.98 g.).

EXAMPLE 43

13-ethyl-17,17-ethylenedioxy-3-methoxygona-1,3,5(10)-trien-11α-ol

Add diborane, generated by adding iodine (9.03 g.) in diethyleneglycol dimethyl ether (30 ml.) to sodium borohydride (3.0 g.) in diethyleneglycol dimethyl ether (90 ml.) at a pressure of 3–4 mm. Hg and passing the gas through a trap at —78° and then condensing in a series of traps surrounded by liquid nitrogen, to a solution of 13 - ethyl - 17,17-ethylenedioxy-3-methoxygona-1,3,5(10), 9(11)-tetraene (5.075 g.) in dry tetrahydrofuran (200 cc.). After 36 hours at 25° in an atmosphere of nitrogen reflux the mixture with aqueous 2 N sodium hydride (45 ml.) and 30% hydrogen peroxide (30 ml.) for 30 minutes, cool, and separate the organic layer. Wash, dry and evaporate and chromatograph the residue of Florisil (150 g.) eluting with benzene to obtain starting material. Elute with benzene-ethyl acetate (19:1) to obtain the title compound as an oil (2.9 g.). Crystallize a sample from aqueous methanol containing a trace of pyridine to obtain the crystalline title compound, M.P. 105–7°.

*Analysis.*—Calc'd for $C_{22}H_{30}O_4 \cdot CH_3OH$ (percent): C, 70.74; H, 8.78. Found (percent): C, 70.28; H, 8.43.

EXAMPLE 44

13-ethyl-11α-hydroxy-3-methoxygona-1,3,5(10)-trien-17-one

Treat 13-ethyl - 17,17 - ethylenedioxy-3-methoxygona-1,3,5(10)-trien-11α-ol (0.38 g.) in acetone (50 ml.) with 2 N hydrochloric acid (2 drops) and reflux for one hour. Remove most of the solvent in vacuo, dilute with ether, and wash, dry and evaporate. Recrystallize the residue from methanol to obtain the title compound (0.216 g.),

15

M.P. 165–7°. Recrystallize from ethyl acetate to obtain a sample, M.P. 169–71°.

*Analysis.*—Calc'd for $C_{20}H_{26}O_3$ (percent): C, 76.40; H, 8.34. Found (percent): C, 76.44; H, 8.26.

EXAMPLE 45

13-ethyl-11α-acetoxy-3-methoxygona-1,3,5(10)-trien-17-one

Treat 13-ethyl-11α-hydroxy-3-methoxygona-1,3,5(10)-trien-17-one (0.977 g.) with acetic anhydride (20 ml.) in pyridine (10 ml.) and allow the mixture to stand at 25° for 16 hours. Remove the solvents in vacuo and recrystallize the residue from ethanol to obtain the title product (0.4 g.), M.P. 135–7°.

EXAMPLE 46

13-ethyl-17β-acetoxy-3-methoxygona-1,3,5(10)-trien-11α-ol

Reflux 13 - ethyl - 11α,17β-diacetoxy-3-methoxygona-1,3,5(10)-triene (0.219 g.) with sodium bicarbonate (0.1 g.) in methanol (10 ml.) and water (0.5 g.) for 2 hours. Pour the cooled solution into water, extract with ether, and wash, dry and evaporate the organic solution to obtain the crude title compound as an oil. Purify by thin layer chromatography on silica gel eluting with benzene-ether (7:3) to obtain the title compound (0.068 g.) as an oil.

EXAMPLE 47

13-ethyl-17β-acetoxy-11α-tetrahydropyranyloxy-3-methoxygona-1,3,5(10)-triene

Treat 13-ethyl-17β-acetoxy-3-methoxygona-1,3,5(10)-trien-11α-ol (0.49 g.) in methylene chloride (15 ml.) and dihydropyran (10 ml.) with concentrated hydrochloric acid (1 drop) and allow the mixture to stand at 25° for 18 hours. Pour into saturated sodium carbonate solution and extract with ether. Wash, dry and evaporate the organic solution and remove traces of solvent from the residue under high vacuum to obtain the title compound as an oil.

EXAMPLE 48

13-ethyl-11α-tetrahydropyranyloxy-3-methoxygona-1,3,5(10)-trien-17β-ol

Add potassium hydroxide (0.5 g.) in water (0.5 ml.) and ethanol (5 ml.) to a solution of 13-ethyl-17β-acetoxy-11α-tetrahydropyranyloxy - 3 - methoxygona-1,3,5(10)-triene in ethanol (20 ml.) and reflux the mixture for 3 hours. Pour the cooled solution into water (200 ml.) containing a few drops of pyridine and extract with ether. Wash, dry and evaporate the organic solution to give the title compound as an oil.

EXAMPLE 49

13-ethyl-17β-(2-hydroxyethoxy)-3-methoxygona-1,3,5(10)-trien-11α-ol

Add boron trifluoride etherate (15.1 ml.) in tetrahydrofuran (150 ml.) during 1½ hours to a solution of 13-ethyl-17,17-ethylenedioxy-3-methoxygona - 1,3,5(10), 9(11)-tetraene in tetrahydrofuran (150 ml.) containing sodium borohydride (3.63 g.) in an atmosphere of nitrogen. Allow the mixture to stand for 19 hours at 25° and add 2 N sodium hydroxide (75 ml.) followed by 30% hydrogen peroxide (75 ml.). Reflux for 30 minutes, pour into water and extract with ether. Wash, dry and evaporate the organic solution and chromatograph the residue on Florisil (100 g.) eluting with benzene containing increasing portions of ethyl acetate to obtain two crystalline fractions. Recrystallize the latter fraction from acetone to obtain the title compound (0.73 g.), M.P. 138–140°.

*Analysis.*—Calc'd for $C_{22}H_{32}O_4$ (percent): C, 73.40; H, 8.91. Found (percent): C, 73.3; H, 8.95.

EXAMPLE 50

13-ethyl-3-methoxygona-1,3,5(10)-triene-11α,17β-diol, diformate

Allow a solution of 13-ethyl-3-methoxygona-1,3,5(10)-triene-11α,17β-diol (0.072 g.) in formic acid (1 ml.) to stand at 25° for 20 hours. Remove the solvent under reduced pressure and recrystallize the residue from ethanol-ether to obtain the title compound (0.06 g.), M.P. 136–137° infrared absorption maxima at 5.8, 8.37μ.

*Analysis.*—Calc'd for $C_{22}H_{28}O_5$ (percent): C, 70.96; H, 7.58. Found (percent): C, 70.89; H, 7.62.

EXAMPLE 51

13-ethyl-17β-(1-hydroxy-2-tetrahydropyranyloxyethyl)-3-methoxygona-1,3,5(10)-trien-11α-ol Add triethyl phosphonoacetate (13.5 g.) dropwise at 25° to a stirred suspension of sodium hydride (3 g. 50% suspension in oil) in 1,2-dimethoxyethane (70 ml.). Stir for 30 minutes, add 3-methoxy-15-ethylgona-1,3,5(10), 9(11)-tetraen-17-one (3 g.) and reflux for 48 hours. Cool, pour into brine and extract with ether. Wash, dry and evaporate the organic solution and chromatograph the residue on Florisol (100 g.), eluting with ether. The early fractions were combined to give 13-ethyl-17-carbethoxyethylidene-3-methoxygona - 1,3,5(10),9(11)-tetraene. Crystallize a portion from light petroleum to obtain material, I.R. peaks. 5.85, 6.05μ. Dissolve this product (0.144 g.) in ether (20 ml.) and add the solution to lithium aluminum hydroxide (0.215 g.) in ether (10 ml.). Reflux for 30 minutes and allow the mixture to stand at 20° for 18 hours. Decompose excess reagent with ethereal ethyl acetate, dilute with ether and wash with dilute hydrochloric acid, aqueous sodium bicarbonate, brine and dry. Evaporate the solution, dissolve the residue in hot ethyl acetate (1 ml.) and dilute with hot petroleum ether (10 ml.). Allow to cool and filter to obtain 13-ethyl-17-hydroxyethylidene - 3 - methoxygona-1,3,5(10),9(11)-tetraene (0.08 g.), M.P. 136–137° or 162–163.5 (isomorphs). Dissolve this compound (1.5 g.) in methylene chloride (10 ml.) and dihydropyran (5 ml.) and add conc. hydrochloric acid (1 drop). After 20 hours neutralize with methanolic potassium hydroxide and evaporate the solvent to obtain 13-ethyl-17-tetrahydropyranyloxyethylidene-3-methoxygona-1,3,5(10),9(11)-tetraene as a gum. All boron trifluoride etherate (9 ml.) in tetrahydrofuran (20 ml.) dropwise to a solution of the foregoing pyranyl ether (1.485 g.) in tetrahydrofuran (100 ml.) containing sodium borohydride (2.15 g.). After standing at 25° for 18 hours, add water to decompose excess reagent and reflux with 2 N sodium hydroxide (50 ml.) and 30% hydrogen peroxide (50 ml.) for one hour. Add water, extract with ether and wash dry and evaporate the organic extract to obtain the crude title compound as a gum (1.83 g.).

EXAMPLE 52

13-ethyl-3-methoxy-17-ethylidenegona-2,5(10)-dien-11α-ol

Add lithium (0.299 g.) to a solution of 13β-ethyl-3-methoxy-17-ethylidenegona-1,3,5(10)-trien-11α-ol (2.01 g.) in tert-butanol (25 ml.), tetrahydrofuran (25 ml.) and dry redistilled liquid ammonia (100 ml.) in an atmosphere of nitrogen. Stir for 40 minutes and then add methanol (10 ml.). Allow the ammonia to evaporate in a stream of nitrogen at 40°, dilute the resulting solution with tetrahydrofuran and wash with brine until neutral. Dry and evaporate the solution and recrystallize the residue from methanol to obtain the title compound (0.818 g.), M.P. 125–128°. Recrystallize several times to obtain a sample, M.P. 138–141°.

EXAMPLE 53

13β-ethyl-3-methoxy-17-ethylidenegona-2,5(10)-dien-11-one

Treat 13β-ethyl-3-methoxy-17-ethylidenegona-2,5(10)-dien-11α-ol (0.546 g.) in dimethylsulfoxide (10 ml.) and pyridine (0.137 ml.) with dicyclohexylcarboxiimide (0.719 g.) and trifluoroacetic acid (0.06 ml.) and allow the mixture to stand at 25° for 48 hours. Add ether, filter the precipitated dicyclohexylurea and wash the filtrate with a phosphate buffer solution (pH 7.5), water and brine, and dry. Evaporate the solvent and wash the residual oil with ice cold hexane (2× 20 ml.) to obtain the title compound as a light yellow solid.

EXAMPLE 54

13-ethyl-17β-hydroxymethyl-3-methoxygona-2,5(10)-dien-11α-ol

Add 13-ethyl-17β-hydroxymethyl-3-methoxygona-1,3,5(10)-trien-11α-ol (0.996 g.) in tetrahydrofuran (50 ml.) to a solution of lithium (1 g.) in redistilled ammonia (150 ml.). Stir for 30 minutes, and add ethanol dropwise until the blue color is discharged. Add water, extract with ether and wash, dry and evaporate the ethereal solution. Recrystallize the residue from ethanol to obtain the title compound as an ethanolate (0.62 g.), M.P. 140–143°.

*Analysis.*—Calc'd for $C_{21}H_{32}O_3 \cdot C_2H_5OH$ (percent): C, 72.97; H, 10.12. Found (percent): C, 72.44; H, 9.98.

EXAMPLE 55

13-ethyl-17β-(1-hydroxyethyl)-3-methoxygona-2,5(10)-dien-11α-ol

Add lithium (8.74 g.) to a stirred solution of 13-ethyl-17β-(1-hydroxyethyl)-3-methoxygona-1,3,5(10)-trien-11α-ol (4.55 g.) in distilled liquid ammonia (700 ml.) and 1-methoxy-2-propanol (235 ml.) in portions over a period of 30 minutes. Stir for a further 3 hours and allow the ammonia to evaporate. Add water (2 l.) to the residue and filter the precipitate. Wash and dry to obtain the title compound (4.2 g.). Recrystallize from acetone-light petroleum to obtain a pure sample, M.P. 100.5–104°; infrared absorption peak at 8.2 mμ.

EXAMPLE 56

13-ethyl-17β-(1-ethylenedioxyethyl)-3-methoxygona-2,5(10)-diene-11α,17-diol

Add lithium (0.2 g.) during 40 minutes to a stirred solution of 13-ethyl-17β-(1-ethylenedioxyethyl) - 3 - methoxygona-1,3,5(10)-trien-11α,17-diol (0.084 g.) in liquid ammonia (70 ml.) and 1-methoxy-2-propanol (10 ml.). Add methanol (5 ml.) and evaporate the ammonia. Add water, extract with methylene chloride and wash, dry and evaporate the organic solution to obtain the title compound (0.092 g.).

EXAMPLE 57

13β-ethyl-17-ethylidenegon-4-en-3-on-17α-ol

Treat 13β-ethyl-3-methoxy-17-ethylidenegona-2,5(10)-dien-11α-ol (1.5 g.) in methanol (50 ml.) and tetrahydrofuran (50 ml.) with 5 N hydrochloric acid (2 ml.) and reflux in an atmosphere of nitrogen for 30 minutes. Add sodium bicarbonate to the cool solution until effervescence ceases and extract with ether. Wash, dry and evaporate the solution and chromatograph the residue on Florisil (70 g.), eluting with light petroleum containing increasing portions of acetone to obtain the title compound (1.0 g.), M.P. 162–166°. Recrystallize several times from acetone-light petroleum to obtain a purified sample, M.P. 167.5–170°.

EXAMPLE 58

13β-ethyl-17-ethylidene-3,3-ethylenedioxygon-5-en-11α-ol

Reflux 13-ethyl - 17 - ethylidenegon-4-en-3-one-11α-ol (1.7 g.) in benzene (75 ml.) and ethylene glycol (10 ml.) with p-toluenesulfonic acid (0.1 g.) for 18 hours under a Dean-Stark water separator. Pour into excess aqueous potassium bicarbonate, and wash, dry and evaporate the organic layer. Recrystallize the residue from ethanol to obtain the title compound.

EXAMPLE 59

13β-ethyl-17-ethylidene-3,3-ethylenedioxygon-5-en-11-one

Add 13β - ethyl-17-ethylidene-3,3-ethylenedioxygon-5-en-11α-ol (2.1 g.) in pyridine (20 ml.) to a suspension of chromium trioxide (2 g.) in pyridine (40 ml.) and allow the mixture to stand for 20 hours. Filter the mixture through a short column of neutral alumina with ethyl acetate, evaporate the eluate and recrystallize the residue from acetone-light petroleum to obtain the title compound.

EXAMPLE 60

13β-ethyl-17-ethylidenegon-4-en-3-on-11β-ol

Allow 13β - ethyl-17-ethylidene-3,3-ethylenedioxygon-5-en-1-one (1.4 g.) in ethanol (50 ml.) and water (2 ml.) to stand at 25° for 5 hours with sodium borohydride (1.5 g.). Add excess 5 N hydrochloric acid and warm the solution at 40° for 30 minutes. Add water and extract with ether. Wash, dry and evaporate the organic solution and recrystallize the residue from acetone to obtain the title compound.

EXAMPLE 61

13-ethyl-17β-hydroxymethylgon-4-en-3-on-11α-ol

Add 13 - ethyl-17β-hydroxymethyl-3-methoxygona-1,3,5(10)-trien-11α-ol (0.696 g.) in tetrahydrofuran (40 ml.) to a solution of lithium (1 g.) in redistilled liquid ammonia (150 ml.). After stirring for 1 hour add absolute ethanol dropwise until the blue color is discharged. Evaporate the ammonia, add ethanol and acidify the warm residue with dilute hydrochloric acid. Allow the mixture to cool, add water and extract with ether. Wash, dry and evaporate the ethereal solution to obtain a solid product. Dissolve in ether (100 ml.) and chromatograph on Florisil (100 g.) eluting with ether and ether-methanol mixtures. Recrystallize the latter fractions from methanol to obtain the title compound, M.P. 194–196°, ultraviolet absorption peak at 241.5 mμ (ϵ 15,900).

EXAMPLE 62

13-ethylgon-4-ene-3,11-dione-17β-carboxylic acid

Add 4 N chromic acid (1.3 ml.) to a stirred solution of 13 - ethyl - 17 - hydroxymethylgon-4-en-3-on-11α-ol (0.264 g.) in acetone (30 ml.) over a period of 5 minutes. After 10 minutes add water (100 ml.) and evaporate the acetone under reduced pressure. Extract thoroughly with ether and wash, dry and evaporate the organic solution and recrystallize the residue from ethanol to obtain the title compound (0.106 g.), M.P. 257–262° (dec.), ultraviolet absorption peaks λ max. 239 mμ (ϵ 16,050).

*Analysis.*—Calc'd for $C_{20}H_{26}O_4$ (percent): C, 72.7; H, 7.93. Found (percent): C, 72.68; H, 7.85.

EXAMPLE 63

13β-ethyl-17-ethylidenegon-4-en-3-on-11β-ol

Treat 13β - ethyl-3-mthoxy-17-ethylidenegona-2,5(10)-dien-11-one (0.25 g.) with sodium borohydride (0.5 g.) in ethanol (20 ml.) and tetrahydrofuran (5 ml.) and allow the mixture to stand at 25° for 5 hours. Acidify with 2 N hydrochloric acid and extract with ether. Wash, dry and evaporate the ethereal solution, and chromatograph

EXAMPLE 64

13-ethyl-17β-(1-hydroxyethyl)-11α-hydroxygon-4-en-3-one

Reflux 13-ethyl-17β-(1-hydroxyethyl)-3-methoxygona-2,5(10)-dien-11α-ol (2.42 g.) in methanol (125 ml.) with 3 N hydrochloric acid (100 ml.) for 15 min. in an atmosphere of nitrogen. Cool, pour into water and extract with ethyl acetate. Wash, dry and evaporate the organic extract and recrystallize the residue twice from acetone to obtain the title compound (0.893 g.), M.P. 195–199°; ultraviolet absorption peak at 242 mμ (ε 15,020).

*Analysis.*—Calc'd for $C_{21}H_{32}O_3$ (percent): C, 75.86; H, 9.70. Found (percent): C, 75.70; H, 9.9.

EXAMPLE 65

13β-ethyl-17β-acetylgon-4-ene-3,11-dione

Add 4 N chromic acid (3 ml.) to a solution of 13-ethyl-17β-(1-hydroxyethyl)-11α-hydroxygon-4-en-3-one (0.552 g.) in acetone (60 ml.) at 5°. Stir at 5° for 15 min., add excess isopropanol and then benzene (50 ml.). Filter the precipitate and wash, dry and evaporate the filtrate to obtain a colorless glass. Recrystallize from isopropanol to obtain the title compound (0.328 g.), M.P. 164–169°; infrared absorption peaks at 5.85, 5.9, 6.05, 6.95μ; ultraviolet absorption maximum at 240 mμ (ε 15,500).

EXAMPLE 66

13-ethyl-17β-acetyl-11α,17-dihydroxygon-4-en-3-one

Reflux 13-ethyl-17β-(1-ethylene dioxyethyl)-3-methoxygona-2,5(10)-diene-11α,17-diol (0.092 g.) with 10% aqueous sulfuric acid (1 ml.) in methanol (10 ml.) and reflux for 1 hour under nitrogen. Extract with ethyl acetate and wash, dry and evaporate the organic solution. Recrystallize the residue from ethyl acetate to obtain the title compound (0.021 g.), M.P. 210–213°; ultraviolet absorption peak at 242 mμ (ε 13,505).

EXAMPLE 67

13-ethyl-17β-acetoxyacetyl-11α,17α-dihydroxygon-4-en-3-one

Stir 13-ethyl-17β-acetyl-11α,17α-dihydroxygon-4-en-3-one (0.5 g.) in methanol (2 ml.) and tetrahydrofuran (3.5 ml.) containing azobisisobutyronitrile (35 mg.) with calcium oxide (0.6 g.) and iodine (0.6 g.) for 2 hours at 25°. Dilute with methylene chloride, filter, and wash the filtrate with aqueous sodium thiosulfate, water and dry. Evaporate the solvent at 25° and reflux the residue with anhydrous potassium acetate (0.8 g.) in acetone (10 ml.) for 16 hours. Evaporate the solvent at 25°, add water and extract with methylene chloride. Wash, dry and evaporate the organic extract and chromatograph the residue on Florisil, eluting with hexane-ether mixtures to obtain the title compound.

EXAMPLE 68

13-ethyl-17β-hydroxyacetyl-11α,17α-dihydroxygon-4-en-3-one

Stir 13-ethyl-17β-acetoxyacetyl-11α,17α-dihydroxygon-4-en-3-one (0.2 g.) in methanol (100 ml.) with potassium bicarbonate (0.4 g.) in water (60 ml.) for 18 hours in an atmosphere of nitrogen. Extract with chloroform and wash, dry and evaporate the organic solution. Recrystallize the residue from acetone-hexane to obtain the title compound.

EXAMPLE 69

13-ethyl-11β,17α-dihydroxy-17β-acetylgon-4-en-3-one

To a solution of 13-ethyl-11β-hydroxy-17-ethylidenegon-4-en-3-one (1 g.) and osmium tetroxide (0.03 g.) in pyridine (0.8 ml.) and tert-butanol (50 ml.) add triethylamine oxide peroxide (1.9 g.) in small portions during 48 hours. Stir with excess aqueous sodium sulfite for 5 minutes and extract with methylene chloride. Wash, dry and evaporate the organic extracts and chromatograph the residue on Florisil (100 g.). Elute with light petroleum containing increasing portions of acetone to obtain the title compound.

EXAMPLE 70

13-ethyl-11β,17α-dihydroxy-17β-acetoxyacetylgon-4-en-3-one

Stir 13-ethyl-11β,17α-dihydroxy-17β-acetylgon-4-en-3-one (0.5 g.) in methanol (2 ml.) and tetrahydrofuran (3.5 ml.) containing azobisisobutyronitrile (35 mg.) with calcium oxide (0.6 g.) and iodine (0.6 g.) for 2 hours at 25°. Dilute with methylene chloride, filter, and wash the filtrate with aqueous sodium thiosulfate, water and dry. Evaporate the olvent at 25°, add yater and extract with methylene chloride. Wash, dry and evaporate the organic extract and chromatograph the residue on Florisil, eluting with hexane-ether mixtures to obtain the title compound.

EXAMPLE 71

13-ethyl-17β-hydroxyacetyl-11β,17α-dihydroxygon-4-en-3-one

Stir 13-ethyl-17β-acetoxyacetyl-11β,17α-dihydroxygon-4-en-3-one (0.2 g.) in methanol (100 ml.) with potassium bicarbonate (0.4 g.) in water (60 ml.) for 18 hours in an atmosphere of nitrogen. Extract with chloroform and wash, dry and evaporate the organic solution. Recrystallize the residue from acetone-hexane to obtain the title compound.

We claim:

1. A 13-ethylgon-5(10)-en-3-one of the structure

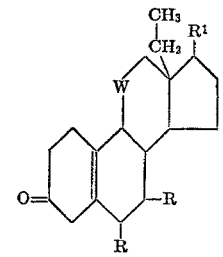

wherein
at least one of the R groups is hydrogen and the other is selected from the group consisting of hydrogen and lower alkyl;
W is >CHOH, or >C=O; and
$R^1$ is selected from the group consisting of hydroxy, oxo, ethylidene, hydroxymethyl, hydroxyethyl, and ethylenedioxy.

2. A 13-ethyl-3-methoxygona-2,5(10)-diene of the structure

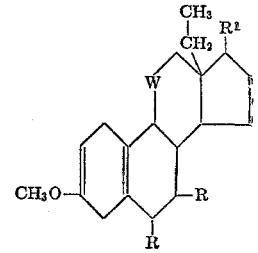

wherein
at least one of the R groups is hydrogen and the other is selected from the group consisting of hydrogen and lower alkyl;
W is >CHOH, or >C=O; and
$R^1$ is selected from the group consisting of hydroxy, hydroxy-methyl, ethylenedioxyethyl, and ethylidene.

3. The compound of claim 2, 13-ethyl-11,17β-dihydroxygon-5(10)-en-3-one.

4. The compound of claim 3, 13-ethyl-3-methoxygona-2,5(10)-diene-11,17-diol.

5. The compound of claim 3, 13-ethyl-17β-hydroxymethyl-3-methoxygona-2,5(10)-dien-11α-ol.

6. The compound of claim 3, 13-ethyl-17β-(1,1-ethylenedioxyethyl) - 3 - methoxygona-2,5(10)-dien-11α,17α-diol.

7. 13 - ethyl - 17 - ethylidene-3-methoxygona-2,5(10)-dien-11α-ol.

8. 13 - ethyl - 17β-(1-hydroxyethyl)-3-methoxygona-2,5(10)-dien-11α-ol.

References Cited
UNITED STATES PATENTS

| | | | |
|---|---|---|---|
| 2,686,792 | 8/1954 | Murray | 260—397.45 |
| 3,234,244 | 2/1966 | Cross | 260—397.45 |

HENRY A. FRENCH, Primary Examiner

U.S. Cl. X.R.

260—397.3, 397.45, 397.5, 999